United States Patent [19]

Hirano et al.

[11] Patent Number: 5,759,402
[45] Date of Patent: Jun. 2, 1998

[54] METHODS FOR THE REMEDIATION OF POLLUTED SOILS

[75] Inventors: Keiji Hirano; Noriyuki Nakayama; Shinya Nakamoto, all of Tokyo, Japan

[73] Assignee: NEC Corporation, Tokyo, Japan

[21] Appl. No.: 787,002

[22] Filed: Jan. 24, 1997

[30] Foreign Application Priority Data

Jan. 29, 1996 [JP] Japan ................... 8-013163
Jun. 21, 1996 [JP] Japan ................... 8-162101

[51] Int. Cl.$^6$ .................................. C02F 3/28
[52] U.S. Cl. .................. 210/610; 210/631; 210/747; 210/203; 210/208; 435/262; 435/262.5; 405/128
[58] Field of Search ............... 210/610, 611, 210/631, 747, 903, 908; 435/262, 262.5, 264; 405/128

[56] References Cited

U.S. PATENT DOCUMENTS

| | | | |
|---|---|---|---|
| 3,843,517 | 10/1974 | McKinney et al. | 210/611 |
| 4,297,122 | 10/1981 | Wallace | 210/610 |
| 4,401,569 | 8/1983 | Jhavari et al. | 210/610 |
| 4,576,717 | 3/1986 | Collin et al. | 210/903 |
| 5,006,250 | 4/1991 | Roberts et al. | 210/747 |
| 5,277,815 | 1/1994 | Beeman | 210/610 |
| 5,342,769 | 8/1994 | Hunter et al. | 210/610 |
| 5,554,290 | 9/1996 | Suthersan | 210/610 |
| 5,618,427 | 4/1997 | Seech et al. | 210/610 |

FOREIGN PATENT DOCUMENTS

| | | |
|---|---|---|
| 466189 | 3/1992 | Japan . |
| 6142686 | 5/1994 | Japan . |
| 7136632 | 5/1995 | Japan . |

OTHER PUBLICATIONS

T. Komatsu et al.; "Biotransformation of cis–1,2–Dichloroethylene by Anaerobic Enrichment Cultures"; Academic Society Meeting of Environmental Water Studies, vol. 18, No. 5 (1995), pp. 396–404.

T. Komatsu et al.; "Mechanism of Hydrogen Utilization by Anaerobic cis–1, 2–Dichloroethylene–degrading Enrichment Cultures"; Academic Society Meeting of Environmental Water Studies, vol. 18, No. 7 (1995), pp. 569–575.

H. Myoga et al.; "Several Factors Affecting the Specific Denitrification Rate of Hydrogen Oxidizing Denitrifiers"; Academic Society Meeting of Environmental Water Studies, vol. 17, No. 10 (1994), pp. 669–675.

Primary Examiner—Christopher Upton
Attorney, Agent, or Firm—Whitham, Curtis & & Whitham

[57] ABSTRACT

Method for the remediation of polluted soils by using microorganisms under anaerobic conditions wherein the degradation action of pollutants such as tetrachloroethylene, nitrate or nitrite by microorganisms under anaerobic conditions is induced or promoted by the addition of silicon to said polluted soils, without any risk of secondary pollution.

9 Claims, 3 Drawing Sheets

NO. 2 of Ex. 4 (addition of Si and $CaCO_3$)

Com. Ex. 4 (non-addition of Si)

METHODS FOR THE REMEDIATION OF POLLUTED SOILS

BACKGROUND OF INVENTION

1. Field of the Invention

This invention relates to a method for the remediation of a polluted soil which comprises degrading pollutants in said soil by making use of a degradation reaction on said pollutants by microorganisms under anaerobic conditions.

2. Description of the Related Art

For the remediation of polluted soils, there have been hitherto suggested a vacuum extraction method wherein pollutants are extracted by suction from soils under reduced pressure; an on-site or off-site method wherein polluted soils are dug out and then subjected to combustion in an incineration plant to burn up pollutants; a thermal desorption method wherein pollutants are liberated from polluted soils by heating; a soil-cleaning method wherein pollutants are leached from soils with water or other solvent; and the like.

However, these methods for the separation of harmful substances (i.e., pollutants) from polluted soils with physicochemical means should necessitate plants or apparatuses to separate pollutants from soils and further plants or apparatuses to make harmless the pollutants thus separated, tend to present the problem to require a considerable cost for installation of facilities, as well as working and maintenance thereof. And further, such methods for physicochemical removal are effective for the highly polluted soils, but they have the problem wherein a removing efficiency is lowered for the soils having low levels of pollution or contamination.

In view of the above, the method to utilize microorganisms capable of degrading pollutants or the so-called bioremediation has been expected to be effective in cost performance and others as the remediation method which is applicable to the soil polluted at relatively lower levels.

An chlorinated organic compounds are pollutants which have been strongly desired for their removal in view of their environmental disruption and others.

As the components of soil pollution by chlorinated organic compounds, there have been presently known those substances which are susceptible to degradation by soil microorganisms only under anaerobic conditions, such as, for example, tetrachloroethylene, carbon tetrachloride and the like. Therefore, it is not expectable that a method for the introduction of methane and oxygen into soils, expecting the action of aerobic microorganisms in soils for the removal by degradation of these compounds.

On the other hand, a method wherein pollutants are degraded by the action of anaerobic microorganisms under anaerobic conditions after soils are made anaerobic by adding organic materials to soils, needs a just enough supply of organic materials into soils.

More specifically, if an amount of the organic material added is insufficient, the degradation to harmless substances could not be sufficiently performed and there would be a risk of pollution due to the accumulation of the intermediate metabolites formed during degradation.

If the amount is in excess, the organic materials added to soils would be dissolved into ground water, which results in a risk to produce a new pollution source.

As apparent from these circumstances, there has been desired a more practicable method of bioremediation in regard to the cost, degradation efficacy and safety thereof.

SUMMARY OF THE INVENTION

It is a primary object of this invention to provide a method which is capable of inducing or promoting more effectively the degradation of pollutants in soils by microorganisms under anaerobic conditions, and may solve the problem and risk encountered in the above prior art, without causing any further pollution by the added materials.

It is a particular object to provide an effective method for the remediation of soils containing as pollutants chlorinated organic compounds.

Accordingly, this invention relates to a method for the remediation of soils which comprises applying silicon as a substance to induce or promote the degradation action by microorganisms on pollutants under anaerobic conditions.

DETAILED DESCRIPTION OF THE PREFERRED EMBODIMENTS

Figure 1:
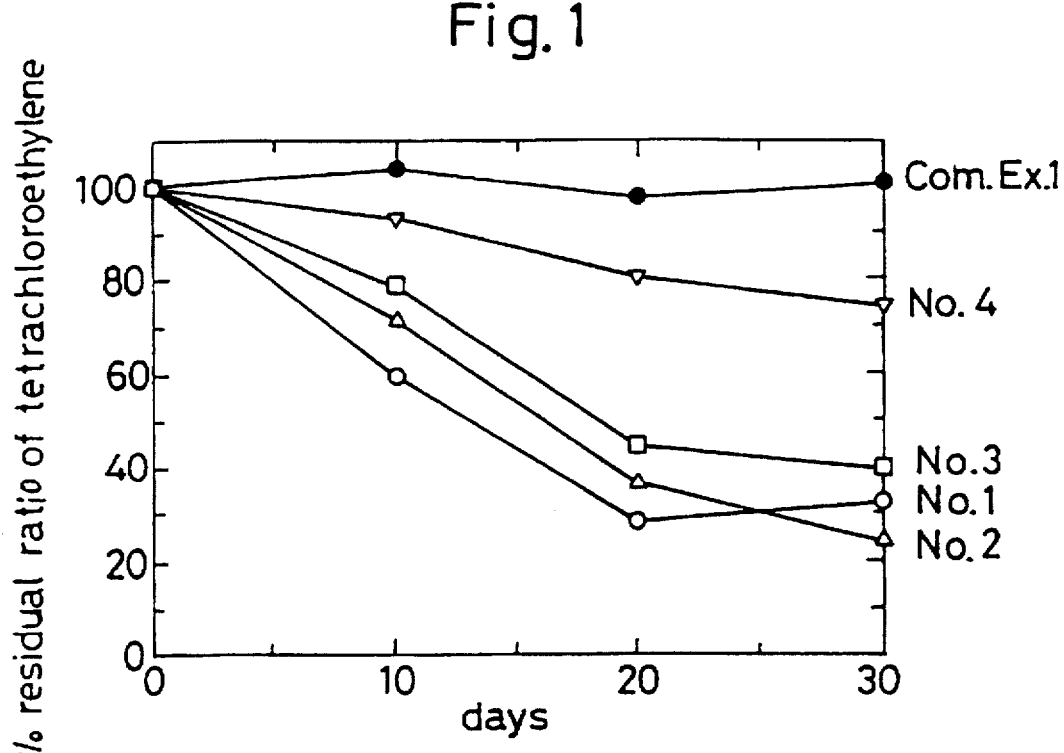
FIG. 1 is a graph showing the degradation effect on tetrachloroethylene when silicon sludge is added to the soils placed into a vial.

The method for the remediation of polluted soils according to this invention is directed to a method for the remediation of polluted soils by the degradation of pollutants in said soils by microorganisms under anaerobic conditions, characterized in that silicon is introduced into said polluted soils and said degradation of pollutants by microorganisms is carried out under anaerobic conditions.

In a preferred embodiment of this invention, an alkali metal salt or an alkaline earth metal salt is added together with silicon to promote the generation of molecular hydrogen from silicon or inorganic carbonate is added together with silicon to reduce the influence of heavy metals, whereby dechlorination reaction by microorganisms using molecular hydrogen as substrate or molecular hydrogen and carbonic acid or denitrification reaction by microorganisms using molecular hydrogen as a substrate is promoted to accomplish an almost complete degradation.

The silicon supplied into polluted soils according to this invention may induce or promote the degradation of pollutants by microorganisms under anaerobic conditions through making anaerobic the area in the soils into which silicon is supplied.

In addition to this, the degrading activity of microorganisms may be enhanced by the presence of molecular hydrogen generated from silicon and the silicon may exhibit the action of not only a simple agent for forming anaerobic conditions but also an agent for improving the degrading activity of microorganisms, whereby a synergistic effect can be attained.

Also, the silicon or molecular hydrogen generated therefrom is not toxic even if retained or accumulated in soils, while there have not found any reports on toxicity of silicon dioxide formed by oxidation of silicon.

Then, this invention provides a method for the remediation of soils without any risk of secondary pollution.

This invention will be explained in greater detail as seen below.

The silicon which may be employed in this invention may be used in various forms and is preferably in the form of particles or fine particles, taking into consideration a spreading efficacy or a handling property in application procedures to soils.

Where silicon particles are to be used, there may be applied those with a particle diameter of, for example, 0.01 μm to 10 μm and preferably of an upper limit of 3 μm and an under limit of 0.05 μm. An amount of the silicon to be supplied into soils may be optionally selected and determined so as to be an amount to accomplish the desired degradation effect.

On the other hand, it is preferable, in view of a penetrating efficacy utilizing capillarity into soil particles and others, to use a suspension formed by suspending particulate silicon in a suitable liquid medium. As such particulate silicon suspension, there may be given silicon sludge which is discarded as an industrial waste from a semiconductor industry.

A content of the particulate silicon in the sludge may be optionally determined and adjusted so as to provide the desired amount of silicon to be supplied into soils.

For introducing silicon into soils, there may be mentioned a method wherein silicon is mixed with soils by spraying over the soil surface; a method wherein soils are dug out and then silicon is mixed with the dug soils; a method wherein a suspension of silicon is spread; a method wherein a feed pipe with feed openings is laid underground and a silicon suspension is supplied through the feed openings, as required, by applying a feeding pressure with a pump; and the like.

Also, a method wherein polluted soils are dug out and placed into a suitable vessel may be carried out by mixing the dug soils with silicon in the vessel.

In the present method for the introduction of silicon, a higher degradation effect on polluted soils can be obtained by using silicon together with at least one of an inorganic carbonates (an inorganic carbonic acid salts), alkali metal salts and alkaline earth metal salts.

As the inorganic carbonate, there may be mentioned, for example, sodium hydrogencarbonate, sodium carbonate, calcium carbonate, ammonium carbonate, ammonium hydrogencarbonate and the like and one or more of them may be employed.

Of these carbonates, sodium hydrogencarbonate and calcium carbonate are more preferable, as they can maintain pH of soils within the neutral range, have no possibility of pollution due to a nitrogen source and promote the generation of molecular hydrogen from silicon.

As the alkali metal salts, there may be mentioned, for example, salts of lithium, sodium and potassium and the like and a combination with a pair ion such as an ion capable of forming chlorides, sulfates and carbonates which may have a less possibility of polluting underground water or soils. Of these salts, sodium chloride, potassium chloride, sodium sulfate, potassium sulfate and sodium hydrogencarbonate are more preferable, as they have a less influence upon microorganisms and environment.

As the alkaline earth metal salts, there may be mentioned, for example, magnesium salts and calcium salts and a combination with a pair ion such as an ion capable of forming chlorides, sulfates and carbonates. Calcium carbonate and magnesium carbonate are preferable, in view of their less influence upon microorganisms and environment.

An amount of the said salt to be added to soils may be optionally selected and determined within the range which may improve the degradation effect of pollutants by the introduction of silicon and is not excessive.

It is believed that the action of the silicon thus introduced is to prepare anaerobic conditions by the generation of molecular hydrogen from silicon in soils, whereby the degradation action on pollutants by microorganisms may be induced or promoted and the degradation effect itself may be strengthened. It is also expectable that a synergistic effect may be obtained by the silicon adsorption of oxygen.

Moreover, silicon has no toxicity derived from a silicon atoms and the silicon oxide formed by the reaction of silicon with oxygen is a component which comprises the highest proportion in soils so that there is no risk of causing a further new pollution even if an amount of the silicon added to soils is excessive.

The method for the remediation of polluted soils according to this invention is to utilize the degradation action on pollutants by microorganisms under anaerobic conditions and, as the microorganisms for this invention, there may be preferably employed microorganisms already found in soils.

There are usually found a wide variety of microorganisms in soils and anaerobic conditions in the area to be cleaned up in soils may be prepared according to the present method, whereby the degradation action by the microorganisms found in the said area may be induced and also the degradation effect may be enhanced by silicon added.

And further, if there is found a less amount of the microorganisms in the soil area to be cleaned up purified, it may be also possible to collect and utilize the microorganisms found, typically, in the sludge obtained from methane fermentation or the sludge found in drainage conduits under anaerobic conditions.

The method for the remediation of polluted soils according to this invention may be preferably applied to the removal of pollutants, for which the degradation action by microorganisms under anaerobic conditions may be utilized and particularly preferable for the degradation of, inter alia, chlorinated organic compounds such as chlorinated hydrocarbons, for example, tetrachloroethylene, trichloroethylene or carbon tetrachloride, or ions such as nitrate or nitrite.

The microorganisms which may be utilized in this invention are not particularly critical provided that it may be any of the microorganisms capable of anaerobically degrading the pollutants to be removed by degradation such as chlorinated hydrocarbons and there may be employed a variety of the microorganisms already known in the art. Illustratively stated, there may be mentioned, for example, the following microorganisms:

Methanosarcina sp.,

Pseudomonas sp.,

*Desulfomonile tiedjei* DCB-1,

*Dehalospirillum multivorans,*

Desulfobacterium sp. and

*Dehalobacter restrictus.*

This invention will be more fully illustrated by way of the following examples and comparative examples.

EXAMPLE 1 AND COMPARATIVE EXAMPLE 1

To a 120 ml-volume vial was placed 50 ml of a solution of an inorganic salt indicated in Table 1 and then 0.1 g (in dry weight) of sludge containing silicon fine particles (an average particle diameter of 0.8 μm) was added, while said silicon fine particles had been separated by a high-speed centrifugation from a back-polishing waste of silicon wafers discharged from the step for manufacturing a semiconductor.

Thereafter, 1 g (in wet weight) of the soils collected from a drainage conduit of a laundry was added. Then, sodium hydrogencarbonate as the inorganic carbonate (also as the alkali metal salt), calcium carbonate as the alkaline earth metal salt and sodium chloride as the alkali metal salt were separately added so as to provide the conditions indicated in Table 3. The gas-phase in each vial containing a sample was replaced with carbon dioxide and each vial was stoppered with a rubber stopper laminate-coated with Teflon and sealed thereover with an aluminum cap. Into all sealed vials were incorporated by means of a microsyringe 1 μl of pollutants, tetrachloroethylene, while keeping the sealed state.

TABLE 1

Composition of inorganic salt solution

| Ingredient | Concentration |
| --- | --- |
| $(NH_4)_2SO_4$ | 1 g/l |
| Nitrilotriacetic acid disodium salt | 0.2 g/l |
| $MgSO_4.7 H_2O$ | 0.29 g/l |
| $CaCl_2.2 H_2O$ | 0.07 g/l |
| $(NH_4)_6Mo_7O_{24}.4 H_2O$ | 0.2 mg/l |
| $FeSO_4.7 H_2O$ | 2 mg/l |
| Salt stock solution*) | 1 ml/l |

*)Salt stock solution had the composition indicated in the following Table 2:

TABLE 2

Composition of salt stock solution

| Ingredient | Concentration (g/l) |
| --- | --- |
| Ethylenediaminetetraacetic acid | 2.5 |
| $ZnSO_4.7 H_2O$ | 10.95 |
| $FeSO_4.7 H_2O$ | 5 |
| $MnSO_4.H_2O$ | 1.54 |
| $CuSO_4.5 H_2O$ | 0.392 |
| $Co(NO_3)_2.6 H_2O$ | 0.248 |
| $Na_2B_4O_7.10 H_2O$ | 0.177 |

TABLE 3

Conditions for preparing samples

| | Sample No. | Silicon fine particles | Added salts | Composition of gas replaced gas-phase |
| --- | --- | --- | --- | --- |
| Example 1 | No. 1 | Added | $NaHCO_3$ 15 mM | $CO_2$:100% |
| | No. 2 | Added | $CaCl_2$ 15 mM | $CO_2$:100% |
| | No. 3 | Added | NaCl 15 mM | $CO_2$:100% |
| | No. 4 | Added | Not added | $CO_2$:100% |
| Comparative Example 1 | No. 5 | Not added | $NaHCO_3$ 15 mM | $CO_2$:100% |

Each vial was allowed to stand in a thermostat at 25° C. and stirred once a day.

An amount of tetrachloroethylene in the gas-phase in the vial was measured daily according to the head space method using a gas chromatography with a flame ionization detector (FID). FIG. 1 shows changes in the residual ratio to the initial concentration calculated from the measurements obtained as above.

As shown in the results of FIG. 1, a decrease in the tetrachloroethylene concentration in all samples to which silicon was added could be observed as compared with the sample of Comparative Example 1 to which silicon was not added.

As compared with the sample No. 4 to which any of the inorganic carbonate, alkali metal salt and alkaline earth metal salt was not added except for silicon, a noticeable decrease in tetrachloroethylene could be observed in the samples No. 1–No. 3 to which any of the said salts was further supplemented and trichloroethylene was detected which corresponded to 40%–60% of the decreased amount. It can be therefore seen that the degradation of tetrachloroethylene was much more promoted by using silicon together with at least one of the said salts.

And, it can be seen that this reaction was mainly based on a microbial reaction, because a decrease in tetrachloroethylene could hardly be observed when the soils had been used after sterilization.

EXAMPLE 2 AND COMPARATIVE EXAMPLE 2

To a 120 ml-volume vial were placed 10 ml of a solution of an inorganic salt indicated in the above Table 1 and 1 g (in wet weight) of the soil collected from the same place as in Example 1.

To the sample in a vial thus prepared was added 0.1 g (in dry weight) of sludge containing silicon fine particles (an average particle diameter of 0.8 μm) was added, while said silicon fine particles had been separated by a high-speed centrifugation from a back-polishing waste of silicon wafers discharged from the process for manufacturing a semiconductor.

The mixture thus obtained was used as Example 2, while the same mixture as above except for no sludge added was used as Comparative Example 2. The gas-phase in the vials of Example 2 and Comparative Example 2 was not replaced with another gas and each vial while kept under atmosphere was stoppered with a rubber stopper laminate-coated with Teflon and sealed thereover with an aluminum cap.

Into all sealed vials were incorporated by means of a microsyringe 0.5 μl of pollutants, carbon tetrachloride, while keeping the sealed state.

Each vial was allowed to stand in a thermostat at 25° C. An amount of carbon tetrachloride in the gas-phase of the vial was measured using gas chromatography with a FID.

In Example 2, a concentration of 1562 vol ppm of the carbon tetrachloride found in the gas-phase when this experiment was started was decreased to 1236 vol ppm after 20 days.

On the other hand, a concentration of the carbon tetrachloride found in the gas-phase in Comparative Example 2 was 1550 vol ppm when this experiment and even after 20 days the carbon tetrachloride remained at 1448 vol ppm. Thus, the degradation of carbon tetrachloride can be promoted by introducing silicon into soils.

EXAMPLE 3 AND COMPARATIVE EXAMPLE 3

To a 120 ml-volume vial were placed 10 ml of a solution of an inorganic salt indicated in the above Table 1 and 1 g (in wet weight) of the soils collected from the same place as in Example 1.

To the sample in the vial thus prepared was added 0.1 g (in dry weight) of sludge containing silicon fine particles (an average particle diameter of 0.8 μm) was added, while said silicon fine particles had been separated by a high-speed centrifugation from a back-polishing waste of silicon wafers discharged from the step for manufacturing a semiconductor.

The mixture thus obtained was used as Example 3, while the same mixture as above except for no sludge added was used as Comparative Example 3. The gas-phase in the vials of Example 3 and Comparative Example 3 was not replaced with another gas and each vial while kept under atmosphere was stoppered with a rubber stopper laminate-coated with Teflon and sealed thereover with an aluminum cap.

Into all sealed vials were incorporated by means of a microsyringe 0.5 μl of pollutants, 1,1,1-trichloroethane, while keeping a sealed state. Each vial was allowed to stand in a thermostat at 25° C. and stirred once a day.

An amount of 1,1,1-trichloroethane in the gas-phase of the vial was measured using a gas chromatography with a FID.

In Example 3, a concentration of 1301 vol ppm of the 1,1,1-trichloroethane found in the gas-phase when this experiment was started was decreased to 993 vol ppm after 20 days.

On the other hand, a concentration of the 1,1,1-trichloroethane found in the gas-phase in Comparative Example 3 was 1302 vol ppm when this experiment and even after 20 days the 1,1,1-trichloroethane remained at 1290 vol ppm. Thus, the degradation of 1,1,1-trichloroethane can be promoted by introducing silicon into soils.

EXAMPLE 4 AND COMPARATIVE EXAMPLE 4

Into a 500 ml-volume acrylic resin vessel was placed 400 g (in wet weight) of the soils which were rich in sand particles and not polluted with chlorinated organic compounds and then 200 ml of a solution of inorganic salts indicated in Table 4 was added.

Thereafter, 5 ml of a sterile water suspension containing 1 g (in wet weight) of the soils collected at the same place as described in Example 1 was added, since the number of the microorganisms in the said sandy soils was smaller.

Triplicated samples mentioned above were prepared and the additives as indicated in Table 5 were added, respectively, and then mixed. Thereafter, the vessel was sealed with an acrylic resin cover having a rubber stopper laminate-coated with Teflon at the sampling port thereof.

To each sample was added 60 mg of tetrachloroethylene via the sampling port and, after mixing, each vessel was allowed to stand at 25° C.

Figure 2:
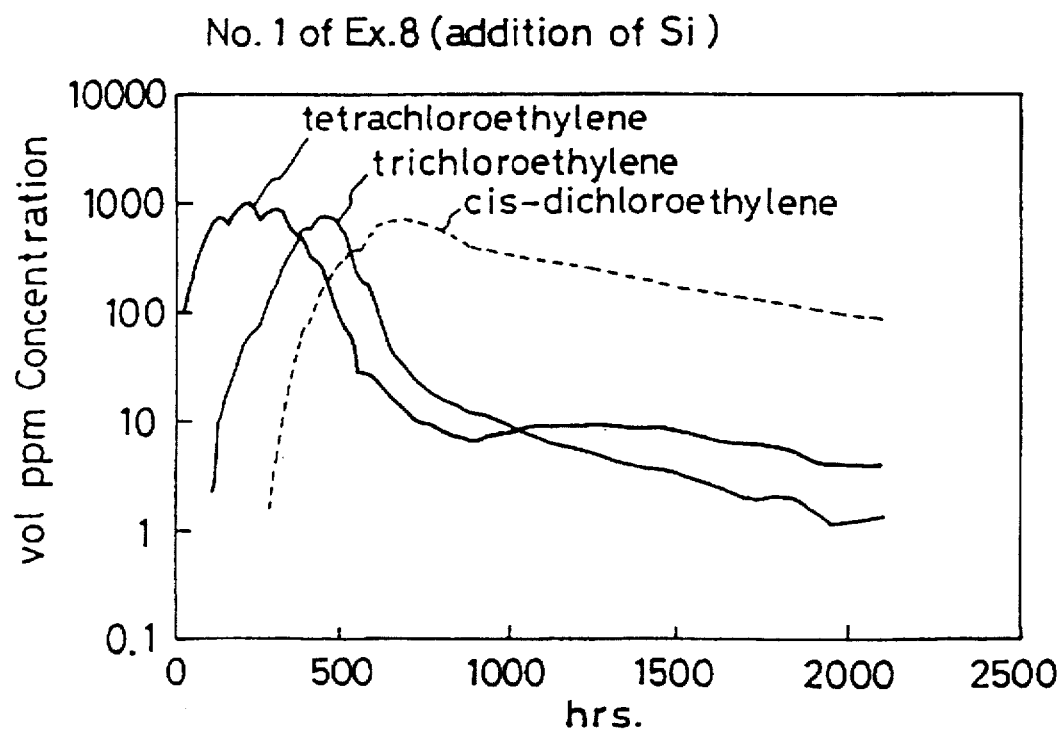
FIG. 2 is a graph showing the degradation effect on chlorinated organic compounds when a silicon sludge is added to the soils contained in a vessel.
Figure 3:
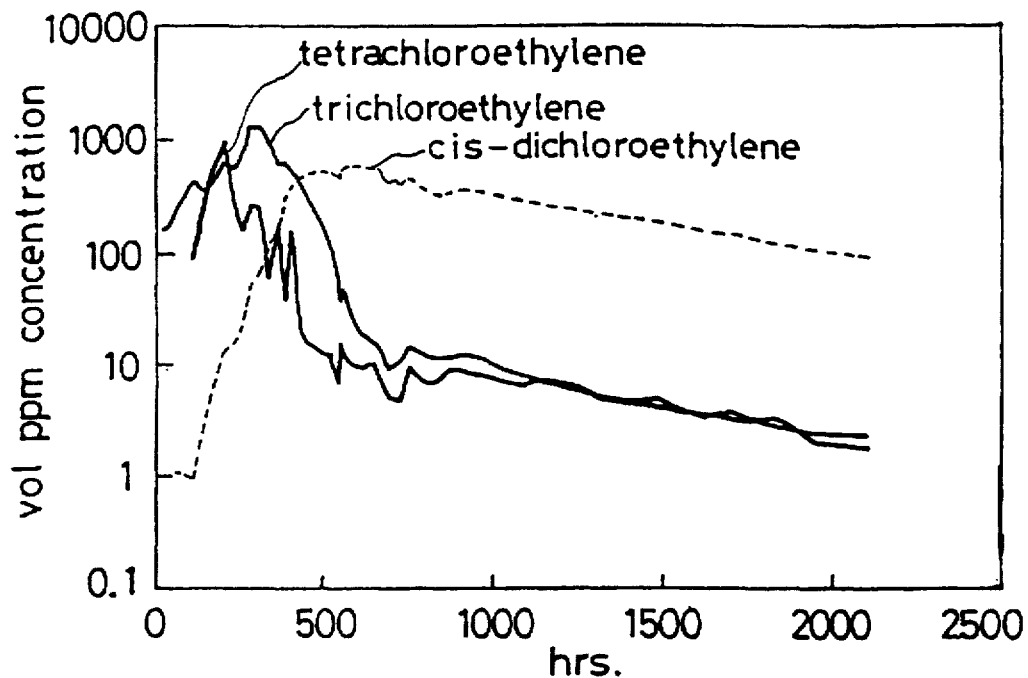
FIG. 3 is a graph showing the degradation effect on chlorinated organic compounds when silicon sludge and calcium carbonate are added to the soils contained in a vessel.
Figure 4:
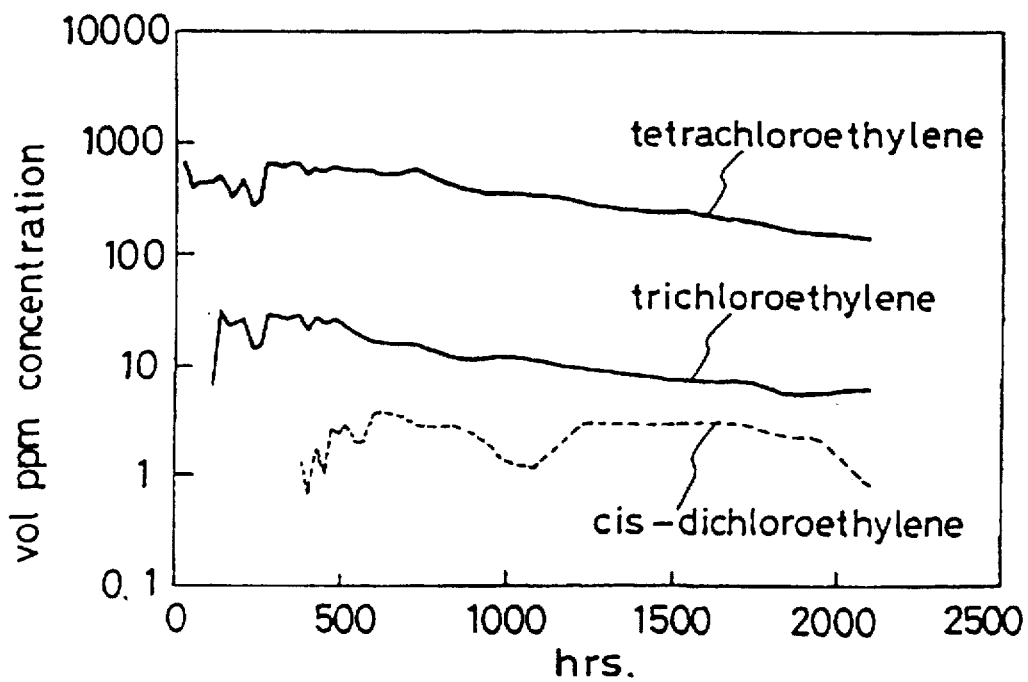
FIG. 4 is a graph showing the degradation of chlorinated organic compounds in the soils contained in a vessel.

The samples measured were optionally collected from the gas-phase in the upper portion of the sample vessel via the sampling port and chlorinated organic compounds were measured using gas chromatography with a FID. The measurement results thus obtained are shown in FIG. 2 to FIG. 4.

Also, after 2100 hours from the addition of tetrachloroethylene to each sample, the liquid-phase in the vessel was sampled and concentrations of the chlorinated organic compounds in the liquid-phase were measured. The results are shown in Table 6.

TABLE 4

| Composition of inorganic salt solution | |
|---|---|
| Ingredient | Concentration (mg/l) |
| NaHCO$_3$ | 200 |
| K$_2$HPO$_4$ | 280 |
| (NH$_4$)$_2$HPO$_4$ | 29 |
| KCl | 30 |
| NH$_4$Cl | 35 |
| FeCl$_3$.6 H$_2$O | 33 |
| MgCl$_2$.6 H$_2$O | 17 |
| MgSO$_4$.7 H$_2$O | 11 |
| CoCl$_2$.6 H$_2$O | 0.8 |
| CaCl$_2$.6 H$_2$O | 6 |

TABLE 5

| Sort of additives | | |
|---|---|---|
| | Sample No. | Additives |
| Example 4 | No. 1 | Silicon*) 2 g |
| | No. 2 | Silicon*) 2 g, CaCO$_3$ 2 g |
| Comparative Example 4 | No. 3 | Not added |

*) Silicon fine particles(an average particle diameter:0.8 μm) separated from the back-polishing waste of silicon wafers similar to those of Example 1

TABLE 6

| Concentration of chlorinated organic compound in liquid-phase of vessel | | | | |
|---|---|---|---|---|
| Sample No. | | Tetrachloroethylene (mg/l) | Trichloroethylene (mg/l) | cis-Dichloroethylene (mg/l) |
| Example 4 | No. 1 | 0.097 | 0.028 | 2.33 |
| | No. 2 | 0.046 | 0.030 | 2.47 |
| Comparative Example 4 | No. 3 | 2.34 | 0.095 | 0.027 |

As shown in the results of FIG. 2 and FIG. 3, it can be observed that, in the sample to which silicon was added, a concentration of tetrachloroethylene in the gas-phase of the vessel was temporarily increased with the generation of molecular hydrogen from silicon, but thereafter it was rapidly decreased, concurrently with an increase in concentrations of trichloroethylene and cis-1,2-dichloroethylene (hereinafter referred to as cis-dichloroethylene), which are believed to be decomposition products from tetrachloroethylene, and further with a decrease due to the decomposition of such chlorinated organic compounds.

On the other hand, as shown in the results of FIG. 4, it can be only observed in the sample to which silicon was not added that a concentration of tetrachloroethylene in the gas-phase of the vessel was slightly decreased and correspondingly a concentration of trichloroethylene was slightly increased, while a concentration of cis-dichloroethylene was hardly increased.

Moreover, as shown in the results of Table 6, concentrations of tetrachloroethylene and trichloroethylene in the liquid-phase of the sample to which silicon was added were lower than those in the liquid-phase of the sample to which silicon was not added, while a higher concentration of cis-dichloroethylene, which was believed to be the decomposition product of such chlorinated organic compounds, was observed in the sample to which silicon was added.

It can be seen from the above results that the degradation of tetrachloroethylene and trichloroethylene was promoted by the addition of silicon.

Furthermore, comparison of the results shown in FIG. 2 with those shown in FIG. 3 has proven that a decrease in concentrations of tetrachloroethylene and trichloroethylene in the gas-phase of the vessel was initiated at an earlier stage in the sample to which silicon was added together with calcium carbonate.

Also, as shown in the results of Table 6, a concentration of tetrachloroethylene in the liquid-phase of the sample to which silicon and calcium carbonate were added was lower than that of the liquid-phase of the sample to which only silicon was added. It can be seen from the above results that the degradation of tetrachloroethylene and trichloroethylene was even more promoted by the addition of calcium carbonate together with silicon. It can be also seen that this invention has proven by this example to be effective even in the case of a larger amount of soils.

EXAMPLE 5 AND COMPARATIVE EXAMPLE 5

To a 120 ml-volume vial were placed 10 ml of a solution of inorganic salts indicated in the above Table 1 and 1 g (in wet weight) of the soil collected from the same place as in Example 1.

To the sample in a vial thus prepared were added pollutant, sodium nitrate and sodium nitrite, so as to be the respective concentrations of 10 mg/l for nitrate and nitrite in the vial and then various components were added and the gas-phase was replaced in the given vial so as to provide the conditions indicated in Table 7.

Thereafter, each vial was stoppered with a rubber stopper laminate-coated with Teflon and sealed thereover with an aluminum cap.

TABLE 7

| | Conditions for preparing samples | | |
|---|---|---|---|
| Sample No. | Silicon fine particles | Added salts | Composition of gas replaced gas-phase |
| Example 5 No. 1 | Added*) | NaHCO$^3$ 15 mM | N2:100% |
| Comparative Example 5 No. 2 | Not added | NaHCO$^3$ 15 mM | N2:100% |

*)0.1 g(in dry weight) of sludge containing silicon fine particles(an average particle diameter of 0.8 μm) was added, while said silicon fine particles had been separated by high-speed centrifugation from a back-polishing waste of silicon wafers discharged from the process for manufacturing a semiconductor.

Each vial wherein the sample was sealed as described above was allowed to stand at 25° C. and sampling was made from each vial. Concentrations of nitrate and nitrite were measured daily by ion chromatography.

Figure 5:
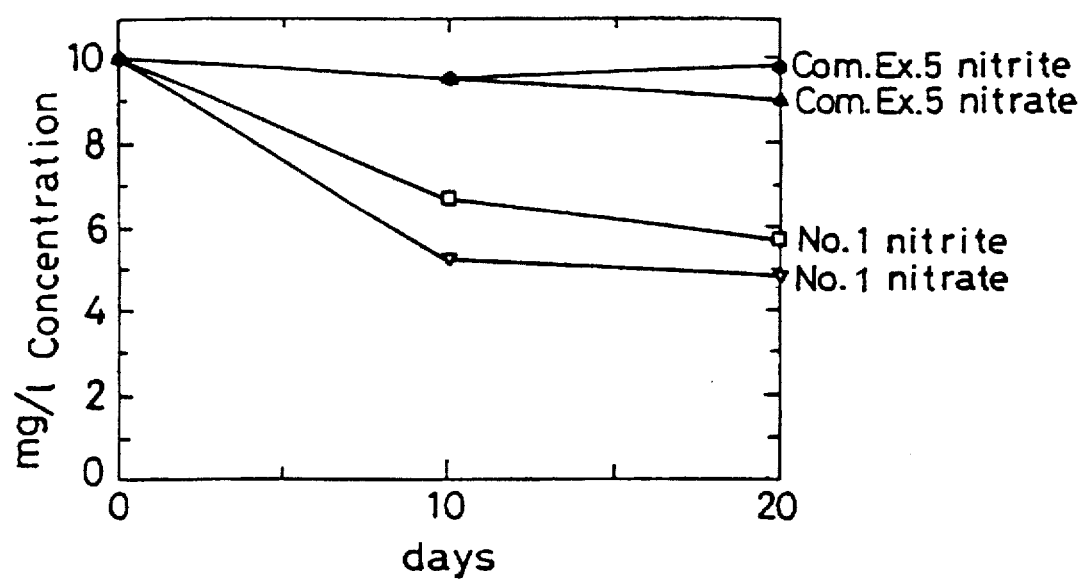
FIG. 5 is a graph showing the removal effect of nitrate and nitrite by the addition of silicon sludge.

As shown by the results in FIG. 5, it can be seen that concentrations of nitrate and nitrite were observed in the cases where the gas-phase was replaced with nitrogen gas in the presence of sodium hydrogencarbonate and where silicon was added and these ions can be removed by the addition of silicon.

A decrease in the concentrations of nitrate and nitrite can not be observed at all in the case where the soils were sterilized and used, which indicates that this reaction is also a microbial reaction.

As explained above, the present method for the remediation of polluted soils is to utilize silicon which is not liable to cause any new pollution even if it may be supplied to soils excessively and then it is a considerably useful method from the aspect of safety. Moreover, the present method for the purification of polluted soils can prepare anaerobic conditions in soils and further induce or promote the degradation of pollutants by microorganisms by the addition of silicon.

What is claimed is:

1. A method for the remediation of polluted soils comprising pollutants in said soils by using microorganisms under anaerobic conditions characterized in that silicon is introduced into said soils and the degradation of pollutants in polluted soils by microorganisms is carried out under anaerobic conditions.

2. The method as claimed in claim 1 wherein inorganic salt is further added to said polluted soils.

3. The method as claimed in claim 1 wherein at least one of alkali metal salts and alkaline earth metal salts is further added to said polluted soils.

4. The method as claimed in claim 1 wherein said silicon is in the form of fine particles.

5. The method as claimed in claim 1 wherein said silicon is introduced into said polluted soils in the form of a suspension suspended in an aqueous medium.

6. The method as claimed in claim 1 wherein said silicon is silicon sludge.

7. The method as claimed in claim 1 wherein said pollutants are chlorinated organic compounds.

8. The method as claimed in claim 7 wherein said chlorinated organic compound is tetrachloroethylene.

9. The method as claimed in claim 1 wherein said pollutant is nitrate or nitrite.

* * * * *